United States Patent [19]

Cotton

[11] Patent Number: 5,477,666
[45] Date of Patent: * Dec. 26, 1995

[54] REEL ASSEMBLY FOR MOWER

[75] Inventor: Donald F. Cotton, Andalusia, Ala.

[73] Assignee: T.I. International, Inc., Andalusia, Ala.

[ * ] Notice: The portion of the term of this patent subsequent to Mar. 8, 2011, has been disclaimed.

[21] Appl. No.: 109,251

[22] Filed: Aug. 20, 1993

[51] Int. Cl.⁶ .................................................. A01D 34/47
[52] U.S. Cl. ...................... 56/251; 56/7; 56/294; 56/DIG. 20
[58] Field of Search ............................ 56/251, 6, 7, 16.7, 56/249, DIG. 20, 294, 250; 83/72; 241/37

[56] References Cited

U.S. PATENT DOCUMENTS

| | | |
|---|---|---|
| 623,121 | 4/1889 | Maynard . |
| 939,837 | 11/1909 | Hayden . |
| 966,800 | 8/1910 | Culver . |
| 1,192,970 | 8/1916 | Yank . |
| 1,441,073 | 1/1923 | English, Jr. . |
| 1,617,045 | 2/1927 | Darling . |
| 1,778,219 | 10/1930 | Kuhlman . |
| 1,847,683 | 3/1932 | Worthington . |
| 2,776,533 | 1/1957 | Yacoby . |
| 2,990,741 | 7/1961 | Haase et al. ................. 83/72 |
| 3,319,408 | 5/1967 | Landwehr . |
| 4,127,980 | 12/1978 | Ferguson ................... 56/11.3 |
| 4,479,346 | 10/1984 | Chandler ................... 56/250 |
| 4,606,178 | 8/1986 | Saiia ......................... 56/249 |
| 4,637,204 | 1/1987 | Benson et al. ............... 56/7 |
| 4,644,737 | 2/1987 | Arnold ...................... 56/249 |
| 4,653,256 | 3/1987 | Saiia ..................... 56/11.9 X |
| 4,663,924 | 5/1987 | Saiia ......................... 56/249 |

FOREIGN PATENT DOCUMENTS

| | | |
|---|---|---|
| 122235 | 9/1946 | Australia . |
| 2607389 | 8/1977 | Germany . |

*Primary Examiner*—Terry Lee Melius
*Attorney, Agent, or Firm*—Hill, Steadman & Simpson

[57] ABSTRACT

A mechanism for use in a reel type lawn mower for maintaining a controlled constant uniform pressure between V-shaped reel blades and a bedknife. The blades are arranged to maintain continuous contact with the bedknife on both sides of the center of the reel. A biasing unit acts between the reel unit and the bedknife unit to apply a regulated pressure on both sides of the reel center in response to a feedback signal such as a temperature signal at the reel/bedknife interface.

13 Claims, 3 Drawing Sheets ical description of the invention which is to be
REEL ASSEMBLY FOR MOWER

BACKGROUND OF THE INVENTION

This invention relates to an improved reel type lawn mower and, in particular, to a reel type mower wherein uniform constant pressure is maintained between the blades of the reel and the bedknife of the machine.

In most conventional reel type lawn mowers, the relative position of the bedknife or the reel can be adjusted or leveled to bring the blades of the reel and the bedknife into proper alignment across the transverse width of the assembly. The adjusting mechanism usually provides for a positive fixed setting of the reel in relation to the bedknife. Once the desired setting is attained, the mechanism is locked in place in an effort to maintain the desired setting and thus avoid chatter, uneven wear and binding of the reel blades with the bedknife.

As is well known in the art, the reel blades become worn with usage thereby requiring constant resetting of the adjusting mechanism. In cases where the mower is subjected to excessive use, as for example, on golf courses, the adjusting mechanism oftentimes must be reset on a daily basis. As the blade wear becomes more pronounced, adjustment becomes more difficult because the helical reel blades typically do not wear uniformly over the length of the blade. To counter this nonuniform wear, the bedknife sometimes is twisted in the machine frame by applying varying forces at either end of the bedknife. The amount of twisting that can be accomplished, however, is rather limited and blade binding becomes a problem. Frequent back lapping of the blades is also required to keep the blades in condition for efficient mowing.

SUMMARY OF THE INVENTION

It is therefore a primary object of the present invention to improve reel type lawn mowers.

It is a further object of the present invention to automatically maintain a desired alignment between the reel and the bedknife of a lawn mower.

A still further object of the present invention is to maintain a constant and uniform pressure between the blades and the bedknife of a reel type lawn mower.

Another object of the present invention is to reduce the amount of time and effort required to maintain a reel type mower in proper adjustment.

Yet another object of the instant invention is to prevent the blades of a reel type mower from binding against the bedknife of the mower.

It is another object of the present invention to maintain a selectable pressure of the reel to the bedknife, easily adjustable during operation of the mower. It is also an object of the invention to provide an automatic control of the pressure between the reel and the bedknife which receives a feedback signal to maintain proper adjustment.

These and other objects of the present invention are attained in a reel type mower having a reel unit and a bedknife unit mounted adjacent to each other in the mower frame. The reel includes a series of V-shaped blades positioned about its periphery with the crown of the blades being located at the center of the reel and the two trailing edges of the blades being twisted rearwardly in the direction of reel rotation. The blades are arranged to move in contact with the bedknife as the reel turns so that at least one point of contact is maintained at all times on either side of the reel center. A biasing mechanism acts between the reel unit and the bedknife unit to maintain a constant contact pressure between the reel blades and the bedknife. The biasing pressure may be derived from a spring mechanism, a hydraulic mechanism, or the like.

A pneumatic or hydraulic system can be provided which uses a feedback signal to control the pressure between the reel and the bedknife. In one embodiment, a controller adjusts the pressure between the reel and the bedknife based on a temperature feedback signal from the interface between the bedknife and reel. If the pressure between the bedknife and reel is too high, an increased temperature caused by increased friction will be sensed by the temperature sensor and a signal will cause the controller to reduce the pressure between the reel and the bedknife. Additionally, a simple pressure sensor of the pneumatic or hydraulic fluid can be used to maintain a constant pressure between the bedknife and reel.

BRIEF DESCRIPTION OF THE DRAWINGS

For a better understanding of these and other objects of the present invention, reference shall be made to the following detailed description of the invention which is to be read in association with the accompanying drawings, wherein.

DETAILED DESCRIPTION OF THE PREFERRED EMBODIMENTS

Figure 1:
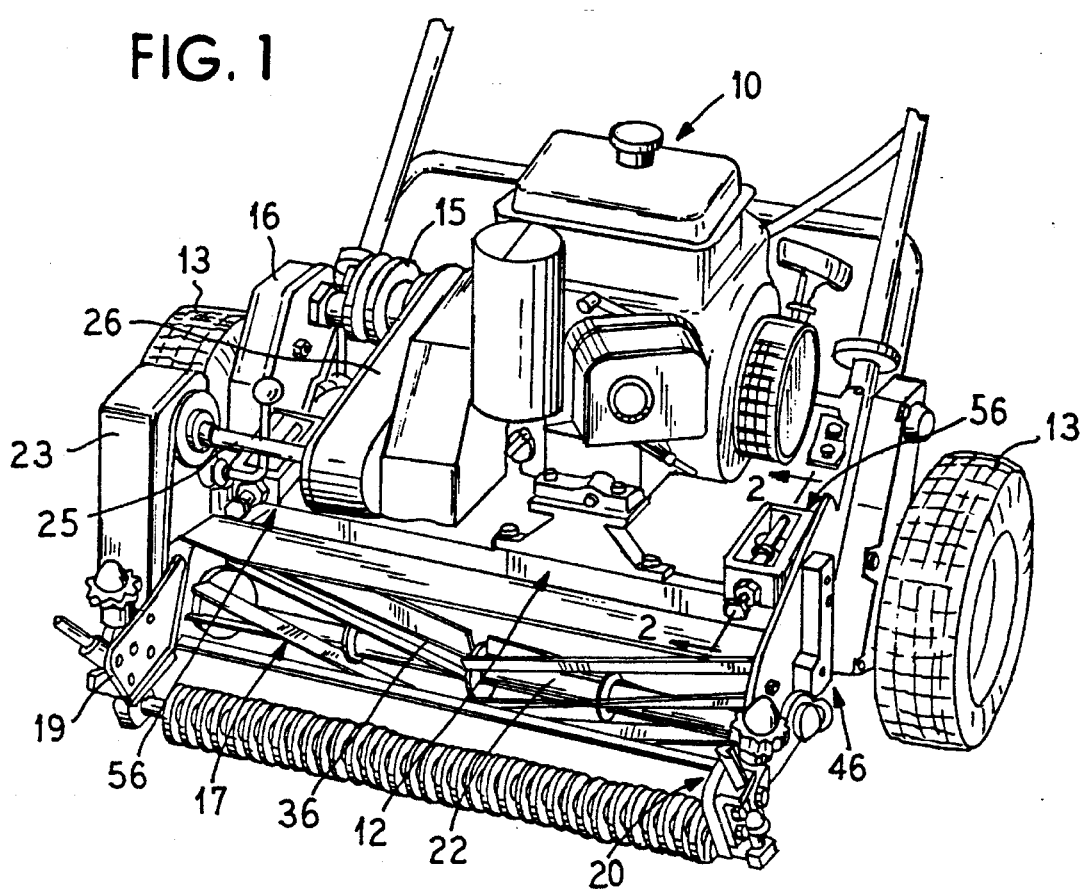
FIG. 1 is a perspective view of a self propelled driven lawn mower embodying the teachings of the present invention.

Referring now to the drawings, and in particular to FIG. 1, there is illustrated a self-propelled lawn mower 10. The mower includes a gasoline powered engine 11 mounted upon a frame 12. A pair of wheels 13—13 are mounted for rotation in the frame and are coupled to the motor drive shaft 15 through means of a power transmission 16. A reel unit, generally referenced 17, is rotatably suspended between two side plates 19 and 20 that are secured to the machine frame by any suitable means such as mounting bolts.

The reel unit contains an axially disposed shaft 22 that is supported within suitable bearing blocks carried by the side plates. The left hand end of the reel shaft as viewed in FIG. 1 passes through side plate 19 and is passed into the housing 23. Although not shown, the extended end of the reel shaft is coupled to a power take-off shaft 25 by means of a timing belt. The power take-off shaft is in turn connected to the motor drive shaft 15 by a second timing belt (not shown) housed within casing 26. A roller unit 27 is suspended between the side plates at the front of the mower which rides in contact with the ground forward of the reel unit. As is well known in the art, the height of the roller unit may be adjusted to regulate the cutting height of the mower.

Figure 2:
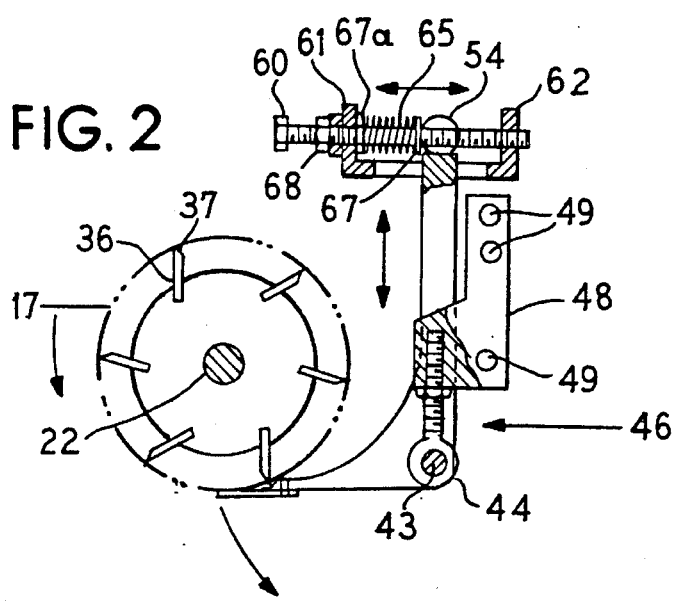
FIG. 2 is a partial side elevation in partial section showing the reel and bedknife mounting arrangement used in the mower of FIG. 1.
Figure 3:
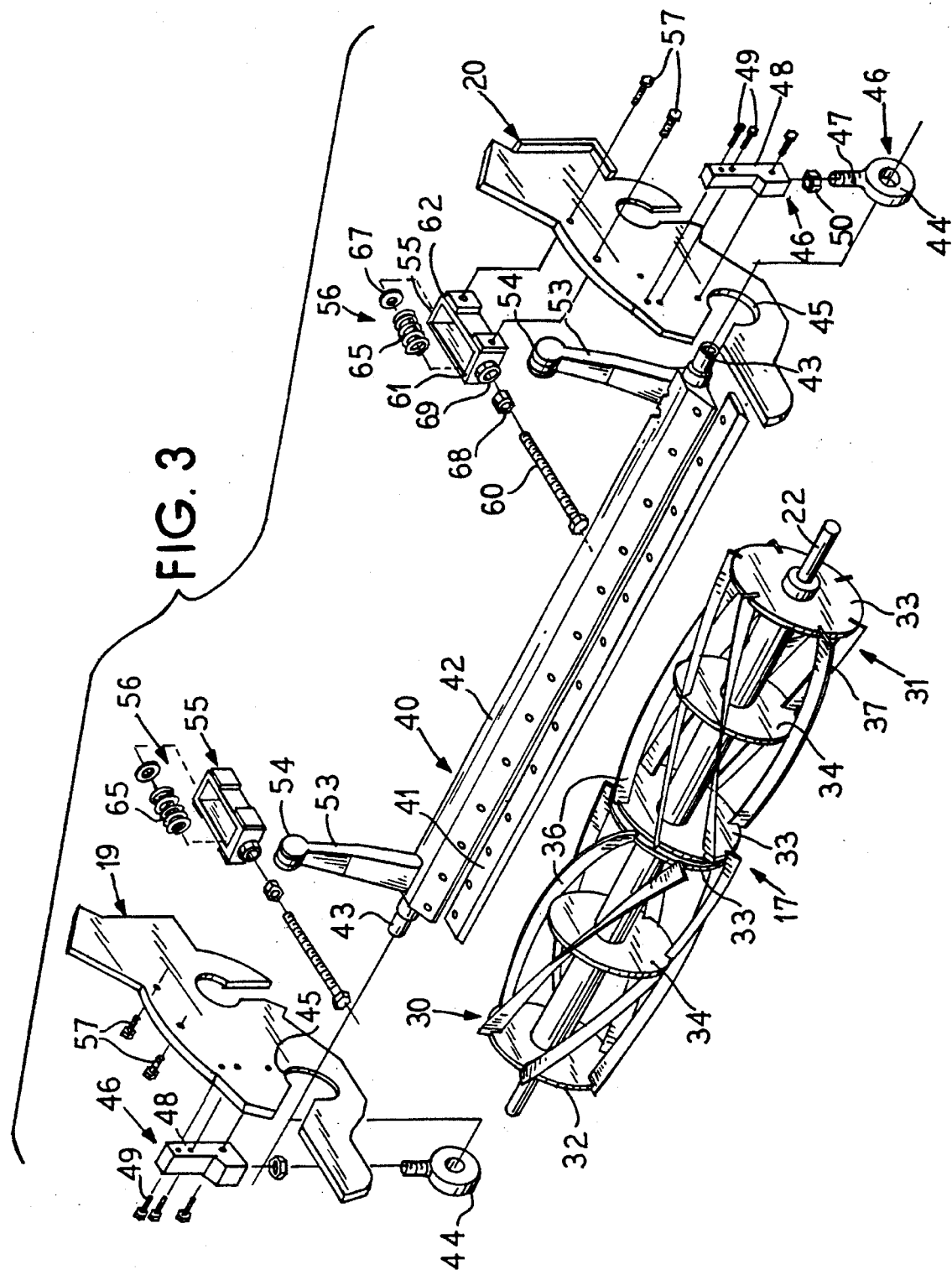
FIG. 3 is an exploded view in perspective showing the reel and bedknife mounting and adjusting components.

As further illustrated in FIGS. 2 and 3, the reel unit 17 includes two axially aligned half sections 30 and 31 which are of similar construction and of equal axial length. Each section contains a pair of opposed radially disposed end discs 32 and 33 and a central disc 34 positioned mid-way therebetween. All discs are of the same diameter and are welded to the reel shaft 22 (for rotation therewith). A series of cutting blades 36—36 are secured to the outer periphery of the discs in each half section. Each blade is helical in form and is twisted along its length. Preferably, each blade is twisted about 45° in ten inches of blade length.

The reel blades are mounted in pairs with one blade in each pair being mounted in one of the adjacent half sections. Each blade pair is generally V-shaped and describes what is herein referred to as a "staggered chevron". In the illustrated embodiment, the inner tips of the blades in a pair which form the point of the chevron do not meet at the axial center of the reel, but rather the tip of one blade is superimposed over the tip of the other. The amount of overlap between tips is shown exaggerated in the drawing for the purpose of clarity. Each blade is twisted rearwardly in the direction of reel rotation so that the point of the chevron contacts the bedknife initially and the blade action is from the center of the chevron outwardly toward its outer tips. Each blade is sharpened in a conventional manner to provide a cutting edge 37 that moves across the bedknife as the reel rotates.

Although a staggered chevron blade configuration is herein illustrated, a true chevron configuration may also be employed without departing from the teachings of the present invention. Such a true chevron is described in U.S. Pat. No. 1,441,073 which is herein incorporated by reference.

A bedknife unit, generally referenced 40, is also pivotally suspended between the two side plates 19 and 20. The bedknife 41 is of conventional design and is attached to an elongated support bar 42 by means of screws. Each end of the bar is equipped with trunnions 43—43. The trunnions pass through openings 45—45 in side plates and are supported for rotation in adjustable bearing units 46—46. Each bearing unit includes a bushing 44 that is fitted onto one of the trunnions and a threaded shank 47 that is screwed into a support block 48. The support block in securely mounted on the outside of the adjacent side plate by means of screws 49—49.

A lock nut 50 is threaded into the shank 47 of each bearing unit which, in assembly, is locked against the bottom wall of the support block to hold the bushing and thus the bedknife at a desired location in regard to the reel unit.

A pair of rocker arms 53—53 extend upwardly from the opposite ends of the bedknife support bar 42. A bifurcated member 54 is located at the distal end of each rocker arm. The bifurcated members, in assembly, are movably mounted inside rectangular shaped brackets 55—55 of adjusting units 56—56. The brackets are secured to the inside walls of side plates 29 and 20 via screws 57—57.

As best illustrated in FIG. 2, a bolt 60 is threaded into the opposing end walls 61 and 62 of each bracket 55. The shank of the bolt is arranged to pass through the two raised arms of the bifurcated member 54 situated in the housing. A compression spring 65 encircles the bolt shank and is adapted to act between the end wall 61 of the bracket and the bifurcated member. A washer 67 is mounted between the spring and the bifurcated member. A spring backer 67a, axially fixed in position with respect to the shank of the bolt, abuts a backside of the spring 65. By turning the bolt within the bracket, the position of the backer 67a is changed which compresses or relieves the spring 65 against the washer 67 and the bifurcated member 54, and thus the biasing force of the spring exerted upon the rocker arm, and thus the bedknife, can be accurately adjusted. A locknut 68 is also threaded on the bolt shank which acts against a raised pad 69 on the bracket to lock the bolt in a desired position.

The bedknife is brought into contact with the blades of the reel using the adjustable bearing units 46—46. When the proper adjustment has been attained, the bearing units are locked in place. The chevrons are arranged so that the trailing edges of the blades on either side of the chevron points are in contact with the bedknife at all times has the chevron rotates in the direction indicated in FIG. 2. By slightly staggering the chevrons on the reel, at least one blade in the next downstream chevron pair will move into contact with the bedknife before the trailing edge of the upstream chevron has cleared the bedknife, thus assuring that there is no interruption in blade contact as one chevron moves off the bedknife and the next chevron moves onto the bedknife.

With the bedknife properly aligned with the reel blades, the biasing tension applied by the bedknife is adjusted by using the bolts 60—60 of the adjusting units 56—56. Using the bolts, the biasing pressure applied by the springs 65—65 is adjusted so that the chevrons are supported on each side of center with a uniform or equal pressure whereby chattering, uneven blade wear and binding is avoided. Tests conducted on the present apparatus show that the mower will stay in proper adjustment for extremely long periods of operation. Because the blades of the reel cannot dig or bind against the bedknife the blades also remain in a sharp condition far longer than the blades of a conventional machine.

Figure 4:
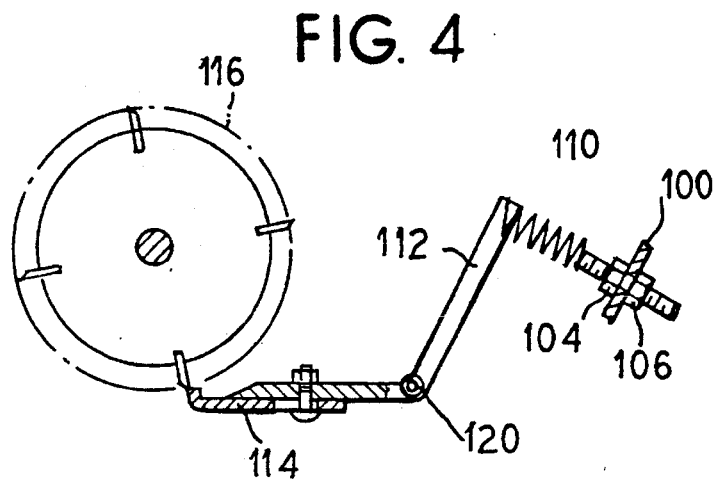
FIG. 4 is a partial side elevation showing an alternate bedknife mounting arrangement for the mower of FIG. 1.
Figure 5:
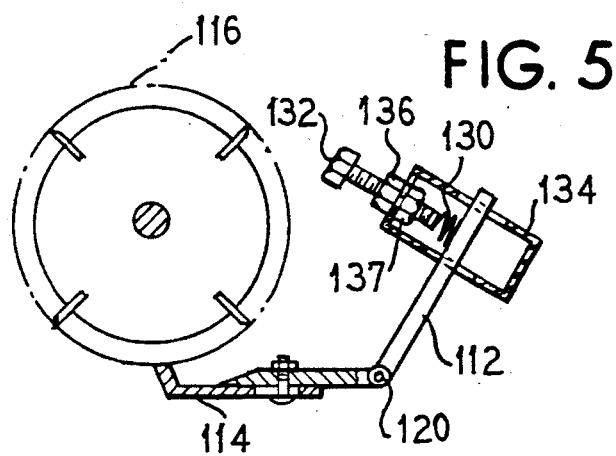
FIG. 5 is a partial side elevation showing a second alternate bedknife mounting arrangement for the mower of FIG. 1.

FIG. 4 and FIG. 5 show alternate arrangements to that shown in FIG. 2 for adjusting the pressure between the bedknife and the reel. In FIG. 4, a fixed bracket 100 is partially shown schematically which would be fixed with respect to the structure of the mower. A threaded rod 102 pierces the bracket 100 and has opposing lock nuts 104, 106 to fix the axial position of the threaded rod 102 with respect to the bracket 100. A tension spring 110 is connected to an end of the threaded rod 102 for axial stretching or relaxation depending on the axial movement of the threaded rod 102, the connection therebetween preferably allowing for axial rotation of the threaded rod 102 without axial rotation of the spring 110. The tension spring 110 is, in turn, connected to a pivoting lever 112 which mounts the bedknife 114, for pressing against the rotating reel 116. The lever 112 is pivoted about a pivoting connection 120.

The arrangement of FIG. 5 uses a compression spring 130 axially connected, preferably rotatably connected, to an adjustment stud 132 journaled within a stationary bracket support 134 of the mower. Opposing lock nuts 136, 137 are provided to set the axial position of the stud 132 with respect to the bracket 134. As an alternate to the second lock nut 137, the bracket 134 can be threaded and a single lock nut 136 can then be used. By altering the position of the stud 132 the compression spring 130 is changed in length which results in an increased or decreased force of the bedknife 114 against the reel 116.

Figure 6:
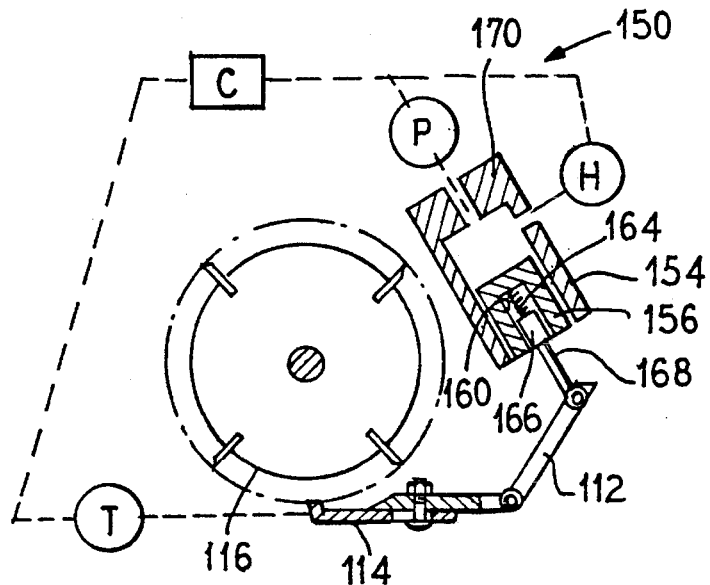
FIG. 6 is a schematic representation of a third alternate bedknife mounting arrangement for the mower of FIG. 1.

FIG. 6 shows a control system 150 for adjusting or automatically controlling pressure of the bedknife 114 against the reel 116. A pressure cylinder such as a hydraulic or pneumatic cylinder 154 is provided with a reciprocally mounted piston assembly 156 therein. The piston assembly 156 further provides a cylinder recess 160 having a compression spring 164 therein abutting a secondary piston 166 which is connected to a rod 168 which connects to the lever 112 holding the bedknife 114. The compression spring 164 allows for movement between the cylinder recess 160 and the secondary piston 166 such as needed when an object passes between the reel 114 and the bedknife 116, such as a rock, and the lever 112 must quickly rotate counter-clockwise to avoid damage to the mower.

The cylinder recess 154 provides a pressure volume 170 which acts on the piston assembly 156. A source of high pressure hydraulic oil, or air, or the like M feeds into the pressure volume 170 to provide force onto the piston assembly 156 for moving the lever 112. A controller C is provided for signal communicating with the hydraulic source H and a pressure sensor P. Thus, a pressure can be sensed by the pressure sensor P and fed back to the controller C for adjusting the pressure source H to provide a select pressure within the pressure volume 170 as is desired.

As a further refinement, a temperature sensor T can sense a temperature near to, on, or adjacent the interface between the bedknife 114 and the reel 116 caused by friction between these two parts. The temperature signal T can be fed back to the controller C which can be programmed to adjust the pressure source H to either increase or decrease the pressure between the bedknife 114 and the reel 116. Other sensors can be utilized for the feedback signal such as sound, force, vibration, grass level, optical etc.

As an alternate to the control system of FIG. 6, a control system can be provided to automatically adjust the spring systems of FIGS. 2, 4 and 5 such as a stepper motor having an output shaft mechanically connected to respective threaded studs or bolts 60, 102, 132 to axially rotate the threaded studs or bolts to adjust the spring bias according to a feedback signal from a sensor such as a temperature sensor T. The lock nuts would not be used.

While this invention has been explained with reference to the structure disclosed herein, it is not confined to the details set forth and this application is intended to cover any modifications and changes as may come within the scope of the following claims.

I claim as my invention:

1. Apparatus for automatically maintaining the reel of a lawn mower in adjustment with the bedknife of the mower that includes a frame;

a bedknife unit for supporting a bedknife in said frame;

a reel unit rotatably mounted in the frame and having blades adjacent to the bedknife;

biasing means for maintaining a contact pressure between the blades and the bedknife as the blades move over the bedknife;

a sensor communicating with said biasing means to adjust the contact pressure of said biasing means; and wherein said-reel unit is divided, said reel unit being divided into two adjacent, axially-aligned half-sections, each half-section further including a series of spaced-apart, radially disposed discs and said blades comprise a plurality of helically-shaped blades mounted upon the outer periphery of said discs, said blades extending transversely across each half-section from the center of the reel to the outer edge thereof, said helical blades being mounted in pairs on the adjacent half-sections with the inner edge of each pair being juxtaposed at the center of the reel, said blades being twisted in the direction of rotation of the reel so that at least one blade on each half-section is capable of contacting the bedknife at any given time.

2. The apparatus of claim 1 wherein the inner tips of the blades in each pair form a chevron.

3. The apparatus of claim 1 wherein said bedknife unit further includes trunnion means for rotatably supporting the bedknife whereby the bedknife is movable into contact with the blades of the reel and said biasing means acts against said bedknife unit to hold the bedknife against said blades with said contact pressure.

4. The apparatus of claim 1, wherein said biasing means comprises a hydraulic actuator movable under pressure influence of a hydraulic fluid or gas and connected to said bedknife unit to move said bedknife unit and having a means for regulating the pressure of the hydraulic fluid or gas corresponding to signals received from said sensor.

5. Apparatus for automatically maintaining the reel of a lawn mower in adjustment with the bedknife of the mower that includes a frame;

a bedknife unit for supporting a bedknife in said frame;

a reel unit rotatably mounted in the frame and having blades adjacent to the bedknife;

biasing means for maintaining a contact pressure between the blades and the bedknife as the blades move over the bedknife;

a sensor communicating with said biasing means to adjust the contact pressure of said biasing means;

wherein said bedknife unit further includes trunnion means for rotatably supporting the bedknife whereby the bedknife is movable into contact with the blades of the real and said biasing means acts against said bedknife unit to hold the bedknife against said blades with said contact pressure; and wherein said bedknife unit further includes a pair of rocker arms and an adjustable spring means acting against the rocker arms to apply a predetermined biasing pressure against the reel blades.

6. The apparatus of claim 5 wherein said spring means further includes a pair of brackets mounted in the frame or adjacent the outside edges of the reel, a spring mounted inside each bracket which is compressed between the bracket and a rocker arm or the bedknife unit, and adjusting means to regulate the spring force acting between the bracket and the rocker arm.

7. The apparatus of claim 6 that further includes a bushing means mounted in the frame for rotatably supporting the trunnion means of said bedknife unit and aligning means for adjusting the position of the bedknife unit to said frame.

8. The apparatus of claim 5 wherein said blades are configured in chevrons across the reel unit.

9. Apparatus for automatically maintaining the reel of a lawn mower in adjustment with the bedknife of the said apparatus including, a frame having two spaced apart side plates extending outwardly from said frame, a reel unit mounted for rotation between said plates, said reel unit further including a plurality of chevron shaped blades mounted thereon with the point of the chevron being located at the center of the reel and the blades of the chevron being twisted in the direction of rotation of the reel, a bedknife unit pivotally mounted in said side plates adjacent to the reel unit having a bedknife that is arranged to contact each chevron blade on either side of the chevron point at the blade moves thereover, a self-adjustable biasing means acting upon the bedknife unit for maintaining a constant uniform pressure between the bedknife and the chevron blade;

wherein said bedknife further includes a pair of raised rocker arms with arms being positioned on either side of the reel center and said biasing means further includes a spring means acting on each of the rocker arms.

10. The apparatus of claim 9, wherein said self-adjustable biasing means comprises a cylinder holding an adjustable pressurized media therein, and a piston within said cylinder, said piston movable under force from said pressurized media, said piston mechanically connected to said bedknife unit to pivot said bedknife unit upon movement of said piston, adjusting the pressure of said pressurized media causing a corresponding adjustment of the pressure of said bedknife against the chevron blades.

11. The apparatus of claim 10 comprising a pressure sensor sensing the pressure of the pressurized media and providing a feedback signal to adjust said pressure to a preselect value.

12. The apparatus of claim 10, wherein said adjustable biasing means comprises a temperature sensor, said temperature sensor sensing temperature at an interface between said bedknife and said chevron blades and providing a feedback signal to adjust pressure of said pressurized media.

13. Apparatus according to claim 9 wherein said adjustable biasing means comprises a cylinder holding an adjustable pressurized media therein, and a piston within said cylinder, said piston movable under force from said pressurized media, said piston mechanically connected to said bedknife unit to pivot said bedknife unit upon movement of said piston, adjusting the pressure of said pressurized media causing a corresponding adjustment of the pressure of said bedknife against said reel unit and a pressure sensor sensing the pressure of the pressurized media and providing a feedback signal to adjust said pressure to a preselect value.

\* \* \* \* \*